(12) United States Patent
Albl et al.

(10) Patent No.: US 10,630,143 B2
(45) Date of Patent: Apr. 21, 2020

(54) SYSTEM COMPRISING AT LEAST TWO ELECTRIC MACHINES

(71) Applicant: AUDI AG, Ingolstadt (DE)

(72) Inventors: Sebastian Albl, Gaimersheim (DE); Jürgen Schmitz, Karlshuld (DE); Albert Scharlach, Oberdolling (DE)

(73) Assignee: AUDI AG, Ingolstadt (DE)

( * ) Notice: Subject to any disclaimer, the term of this patent is extended or adjusted under 35 U.S.C. 154(b) by 65 days.

(21) Appl. No.: 15/886,133

(22) Filed: Feb. 1, 2018

(65) Prior Publication Data
US 2018/0241284 A1 Aug. 23, 2018

(30) Foreign Application Priority Data
Feb. 21, 2017 (DE) .................. 10 2017 202 721

(51) Int. Cl.
| | |
|---|---|
| *H02K 7/18* | (2006.01) |
| *H02K 16/02* | (2006.01) |
| *H02K 16/00* | (2006.01) |
| *H02K 7/00* | (2006.01) |
| *H02K 9/19* | (2006.01) |
| *H02K 15/02* | (2006.01) |
| *H02K 1/20* | (2006.01) |

(52) U.S. Cl.
CPC ........... *H02K 7/1807* (2013.01); *H02K 7/006* (2013.01); *H02K 9/19* (2013.01); *H02K 15/02* (2013.01); *H02K 16/00* (2013.01); *H02K 16/02* (2013.01); *H02K 1/20* (2013.01)

(58) Field of Classification Search
CPC ........ H02K 7/1807; H02K 7/006; H02K 9/19; H02K 15/02; H02K 16/00; H02K 16/02; H02K 1/20; H02K 47/04; H02K 47/14; H02K 47/20
USPC .... 310/310, 113, 114, 254.1, 52, 53, 54, 55, 310/60 A, 64
See application file for complete search history.

(56) References Cited

U.S. PATENT DOCUMENTS

| | | | | |
|---|---|---|---|---|
| 725,675 | A * | 4/1903 | Collins .................. | H02K 35/02 290/1 R |
| 1,612,330 | A * | 12/1926 | Trumpler ............... | H02K 16/00 307/51 |
| 1,980,165 | A * | 11/1934 | Burleigh ................ | B60K 6/442 290/14 |
| 2,018,830 | A * | 10/1935 | Bohli ................... | H02K 21/125 310/70 R |

(Continued)

FOREIGN PATENT DOCUMENTS

| | | |
|---|---|---|
| CN | 102769346 A | 11/2012 |
| DE | 258986 A | 4/1913 |

(Continued)

OTHER PUBLICATIONS

Examination Report dated Oct. 27, 2017 of corresponding German patent application No. 102017202721.5; 10 pgs.

(Continued)

*Primary Examiner* — Alfonso Perez Borroto
*Assistant Examiner* — Ahmed Elnakib
(74) *Attorney, Agent, or Firm* — Maier & Maier, PLLC

(57) ABSTRACT

An electric machine, which includes a rotor rotatable about a shaft and a stator. The stator is provided with a stator metal plate whose outer wall is locally limited and flattened in at least one location and otherwise is formed with a round shape.

3 Claims, 2 Drawing Sheets

(56) References Cited

U.S. PATENT DOCUMENTS

| | | | | |
|---|---|---|---|---|
| 2,782,328 | A | * | 2/1957 | Lindberg ............... H02K 16/00 |
| | | | | 310/112 |
| 3,471,729 | A | * | 10/1969 | Godin ..................... H02K 5/04 |
| | | | | 310/112 |
| 3,510,707 | A | * | 5/1970 | Latta ....................... H02K 5/04 |
| | | | | 310/112 |
| 4,252,506 | A | | 2/1981 | Hannibal |
| 2003/0011260 | A1 | * | 1/2003 | Hamann ............... H02K 16/02 |
| | | | | 310/112 |

FOREIGN PATENT DOCUMENTS

| | | |
|---|---|---|
| DE | 28 49 869 A1 | 5/1980 |
| DE | 32 34 673 A1 | 3/1984 |
| DE | 8804755 U1 | 6/1988 |
| EP | 0910487 B1 | 8/2002 |
| GB | 289294 A | 4/1928 |
| GB | 2 035 713 A | 6/1980 |
| JP | S59-213271 A | 12/1984 |
| JP | 2003-180043 A | 6/2003 |

OTHER PUBLICATIONS

European Search Report dated Jun. 25, 2018, in connection with corresponding European Application No. 18155053.4; 8 pgs.

Office Action dated Jul. 22, 2019 in corresponding Chinese Application No. 201810126537.0; 12 pages including English-language translation.

European Examination Report dated Jan. 15, 2020, in corresponding European patent application No. 18155053.4 including partial machine-generated English language translation; 10 pages.

\* cited by examiner

SYSTEM COMPRISING AT LEAST TWO ELECTRIC MACHINES

FIELD

The Invention relates to a system comprising at least two electric machines and to a method for producing a system comprising at least two electric machines.

BACKGROUND

An electric machine includes a stationary stator, as well as a rotor that is rotatable relative to the stator. Furthermore, this electric machine can be operated as a motor so that electric energy is converted into mechanical energy. However, it is also possible to operate the electric machine as a generator so that the mechanical energy is converted to electric energy. If an apparatus, such as a vehicle, requires a plurality of electric machines, these machines need to be arranged in the apparatus in a space saving manner or so as to save installation space.

The document DE 88 04 755 U1 describes a stator packet of an electric machine, wherein the stator packet consists of identically formed metal plates, while the metal plates are provided with misaligned surfaces having a circular shape in outline.

The document DE 258 986 A describes a dual use magneto-electric machine used for light and for ignition current.

The document EP 0 910 487 B1 describes a press unit and a method for producing a lamination stack, from which a rotor or a stator of an electric motor is produced.

SUMMARY

Against this background, the object was to produce at least one electric machine with a space-saving installation space design.

This object is achieved with an electric machine, a system, and a method having the features of the independent claims. Embodiments of the electric machine, of the system and of the method will be evident from the dependent claims and from the description.

The system according to the invention comprises at least two electric machines which are arranged next to each other, so that locally limited and flattened locations at the outer walls of the stator sheet metals of two directly adjacent electric machines are facing each other or are mutually facing each other. Each electric machine comprises a rotor that is rotatable about a shaft and a stator, wherein the stator is provided with a stator metal plate whose outer wall is formed flattened in at least one locally limited location, while otherwise it is round.

As a rule, the outer wall of the stator block is flattened only in one such locally limited location. However, it is also possible that the outer wall of the stator block comprises several locally limited flattened locations.

It is further also possible that for each of the two directly adjacent electric machines, the locally limited flattened locations of the outer walls of the stator block are mutually connected to a common stator metal plate.

The system is in one possible embodiment provided with only one housing in which the at least two electric machines are jointly arranged. In this case, it is possible that the electric machines that are arranged in the common housing are mutually connected by means of the common stator metal plate. As an alternative, it is also possible that the electric machines arranged in the common housing are separated from each other, wherein each electric machine is provided with a stator metal plate, and wherein the locally limited flattened locations of the outer walls of the stator metal plates of the directly adjacent electric machines are facing each other or are mutually facing each other inside the common housing.

In the system, the stators are provided with at least two directly adjacent electric machines in the embodiment of a common stator metal plate, which consists of a plurality of stator metal plates.

In this case, the stators are mutually connected to one another and/or joined by means of the common stator metal plates. The joint stator metal plate is provided with an opening for each electric machine. The stator windings as well as the rotors of each respective electric machine are arranged inside each opening. In this case, the respective openings or inner walls of the openings surround coaxially the stator windings and the rotor.

At the same time, these openings are arranged parallel to each other and depending on the definition, they are surrounded by the joint stator metal plate, wherein the joint interfaces for the stators or individual stator metal plates of the common section of the locally limited flattened stator metal plates are arranged directly between the openings of the directly adjacent electric machines.

Furthermore, the electric machines are arranged in the embodiment in a joint housing.

It is possible that the system is provided with one common cooling circuit for at least two directly adjacent electric machines. In this case, it is further also provided that the at least one cooling circuit and/or channels for a coolant of this cooling circuit surround or enclose at least the stators of both directly adjacent machines or of all electric machines, at least partially, or completely. As an alternative or additionally, the cooling circuit may also include channels for the coolant, which are designed for example as holes or as bores and which are at least partially or fully integrated in the common stator metal plate.

As a rule, the shafts of the electric machines are arranged parallel to each other.

In addition, the rotor of each electric machine is arranged coaxially inside the stator, usually inside the stator windings of the stator.

The system can be used for operating an apparatus, such as for example of a vehicle, and it can be associated with an apparatus, for example with a vehicle, which is to say that it can be arranged on a vehicle. In this case it is provided that the system is as a rule equipped with two electric machines which are mutually connected to one another according to the design by means of their stator metal plates.

According to the method for producing a system according to the invention, the system is produced from at least two electric machines, wherein each electric machine comprises a rotor that is rotatable about a shaft and a stator, wherein a stator metal plate is provided for the stator, whose outer wall is locally limited and flatted in at least one location, while otherwise it is constructed with a round shape.

In an embodiment, it is provided that an original stator metal plate is provided with a completely round outer wall which is flattened and locally limited at least in one location, or cut and formed in such a manner, wherein a modified stator metal plate is produced from an original stator metal plate at least in one location.

In this case it is possible that the stator metal plates of the electric engines, which are arranged directly adjacent to one another, are mutually connected by means of and/or in the locally limited flattened location of the outer walls of the stator metal plates, wherein the stator metal plates are mutually connected to one another at least in sections to a common stator metal plate.

The method is provided for producing a system comprising at least two electric machines, wherein each electric machine comprises a rotor rotatable about a shaft and a stator, wherein the stators of two directly adjacent electric machines are produced from a common stator metal plate.

In an embodiment, individual or original stator metal plates of the directly adjacent electric machines or of electric machines arranged to be directly adjacent are mutually connected or at least partially connected to a common stator metal plate and joined together. Here, in each case a single original stator metal plate of an electric machine is formed from a cropped and/or partially flattened metal plate packet, which is to say a metal plate that is locally limited and flattened at least in one location.

The common stator metal plate is arranged in the embodiments in a common housing that is provided for the electric machines.

In this case, it is possible that the stator windings and a rotor are arranged in the respective openings of the common stator metal plate either before the common stator metal plate is arranged in the common housing, or afterwards.

It is also possible that the common stator metal plate is formed for the directly adjacent electric machines. This also includes the measure wherein the common stator metal plate is produced from an original stator metal plate which comprises the openings for the stator windings and the rotors of the electric machines.

The system presented here includes as a rule two electric machines. With the measure according to which both of these electric machines are provided with a common stator metal plate, it is possible to arrange their shafts and/or rotors parallel to each other, so that the dimensions of both shafts are reduced.

In order to produce the system, it is among other options also possible that the common stator metal plate is formed by connecting two original stator metal plates, wherein such a stator plate is formed with a cropped form of a metal plate packet which is flattened and locally limited in at least one location of its outer wall. It is further also provided that the electric machines are provided not only with a common stator metal plate, but that they are also equipped with a common housing or a housing unit in which the electric machines are arranged.

The system presented here is suitable for example for a vehicle that is designed as a motor vehicle. In this case, the system can be arranged for example in the rear of the vehicle. The stator, the rotors, as well as the shafts of the electric machines, which are as a rule arranged parallel to each other, are arranged in the vehicle for example parallel to the forward direction of the travel of the vehicle, or perpendicularly to the forward direction of the travel of the vehicle.

Since a common stator metal plate or a corresponding stator metal plate packet is provides, it is possible to reduce the dimensions of the shafts of the electric machines. In this case it is further also possible that the common stator metal plate includes a joint or combined cooling for the electric machines and/or a cooling circuit for the fluid.

A magnetic flux required for the operation of the electric machines is in this case optimized by means of a suitable rotational direction of the rotors of the electric machines for a standard journey of the vehicle. Overall, it is possible to set the rotor shafts of the electric machines back so that they will be closer to each other. With the measure wherein the common stator metal plate is produced for example from cropped metal plate packets, the footprint of the shafts of the electric machines can be reduced as well.

If the system is provided with two electric machines, it is possible for the common stator metal plate and/or for the common housing to be provided in the shape of reading glasses. The wall thickness of the housing can thus be reduced, so that a larger installation space can be provided for the electric machines for the generation of a torque.

The system as well as the method presented here normally combine two electric machines with the common stator metal plate. At the same time, both openings, which enclose the common stator metal plate for the two electric machine, are arranged next to each other as well as parallel to each other. However, it is also conceivable that the system can be realized for a higher number than for only two electric machines.

If the system is provided with three electric machines, they will be also provided with a common stator metal plate in which the three electric machines are enclosed by three openings, so that the shafts of the electric machines pass through the centers of the openings, or for example so that they are arranged in the corner points of an equilateral triangle. If the system is provided for example with three electric machines, the common stator metal plate encloses three openings, whose centers are arranged as corner points of a square relative to one another.

If the system is provided for example with four electric machines, the common stator metal plate encloses four openings whose centers are arranged as corner points of a square relative to each other. In this case, each stator metal plate of an electric machine is provided on its outer wall with a plurality of locally limited flattened locations, wherein two such flattened locations of two directly adjacent electric machines are facing each other and are mutually connected.

BRIEF DESCRIPTION OF THE DRAWINGS

The invention will be next explained in detail based on embodiments which are schematically illustrated in the figures with reference to the symbols used in the figures.

The figures are described in a coherent manner and comprehensively, the same reference numerals are assigned to the components.

FIGS. 1a, 1b and 1c schematically illustrate the steps that are used when an embodiment of a method according to the invention is carried out, first when two original electric machines 2a, 2b are used as starting materials (FIG. 1a), and then when products of an embodiments of electric machines 2a, 2b are created (FIG. 1b). The embodiment of the system 4 according to the invention is produced as another product (FIG. 1c) from both electric machines (2a, 2b).

Figure 1A:
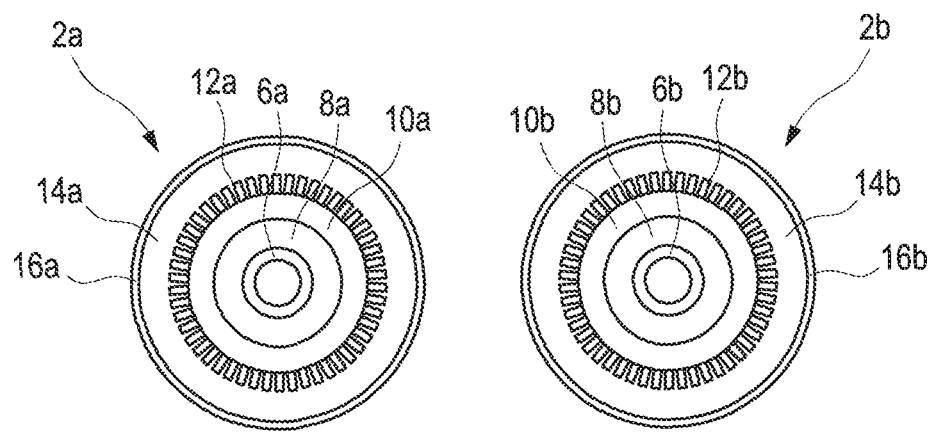
FIG. 1a shows a first schematic illustration of an embodiment of the system according to the invention which is produced as an embodiment of the method according to the invention.

In this case, each of both original electric machines 2a, 2b comprises, from the inside to the outside part, a central shaft 6a, 6b, which is coaxially enclosed by a rotor metal plate 8a, 8b. This arrangement is then again enclosed by the rotor grooves 10a, 10b. A stator of an original electric machine 2a, 2b includes winding grooves or stator windings 12a, 12b, which coaxially enclose the rotor metal plate 8a, 8b, as well as the rotor grooves 10a, 10b. In this case, the winding grooves 12a, 12b are respectively enclosed by the original stator metal plates 14a, 14b, which are in turn enclosed by an original cooling circuit 16a, 16b.

Figure 1B:
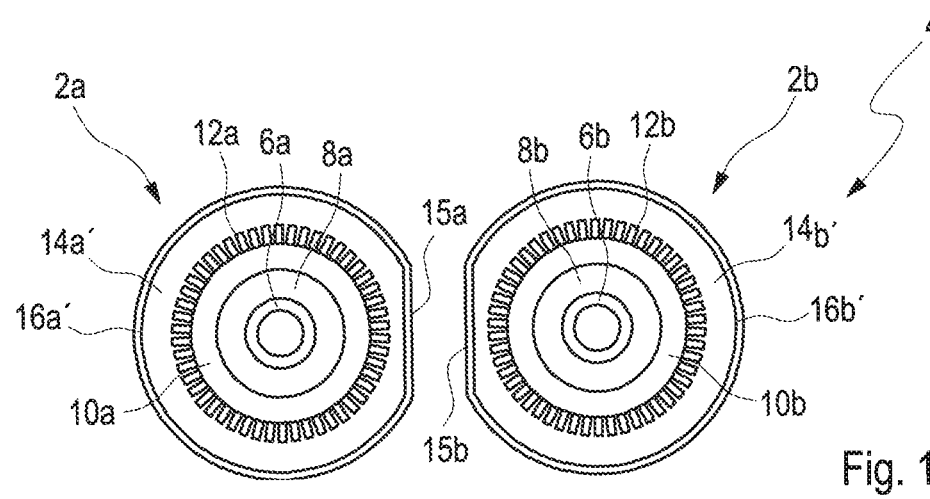
FIG. 1b shows a second schematic illustration of an embodiment of the system according to the invention which is produced as an embodiment of the method according to the invention.

FIG. 1b shows how both original electric machines 2a, 2b are modified in the embodiment of the method, starting from the state shown in FIG. 1a. In this case, each electric machine 2a, 2b is respectively flattened at the originally circular stator plate 14a, 14b at a position 15a, 15b, so that a locally limited flattened stator metal plate 14a', 14b' is formed for the respective electric machine 2a, 2b. It is further also provided that the original circular coolant circuit 16a, 16b that is provided for each electric machine 2a, 2b is flattened in one location so that a flattened coolant circuit 16a', 16b' is formed. Furthermore, in order to produce the embodiment of the system 4 shown here, the flattened locations 15a, 15b of the electric machines 2a, 2b are facing each other and they are arranged close to each other.

In another step of the method it is provided that the flattened stator metal plates 14a', 14n' are then connected or joined to each other at and/or along both sections 15a, 15b by welding or by soldering, which step is thus used as a possible thermal joining process, so that a common stator metal plate 18 is formed for both electric machines 2a, 2b. In addition, the flattened coolant circuits 16a', 16b' are combined to form a common coolant circuit 20. Furthermore, the electric machines 2a, 2b, which are now joined to each other by means of the common stator metal plate 18 as well as by means of the common cooling circuit 20, are arranged inside a common housing 22. In this case, the common stator metal plate 18 includes holes for the channels of the common coolant circuit 20.

Figure 1C:
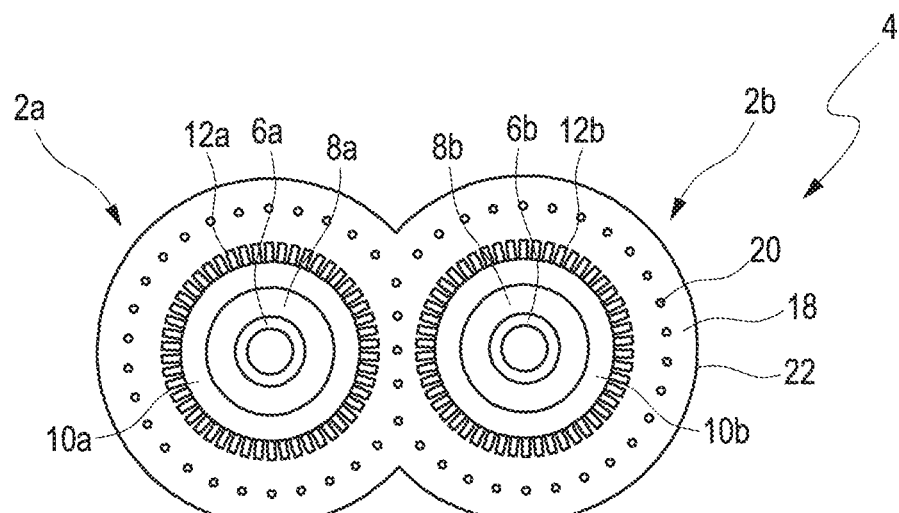
FIG. 1c shows a third schematic illustration of an embodiment of the system according to the invention which is produced as an embodiment of the method according to the invention.
Figure 2:
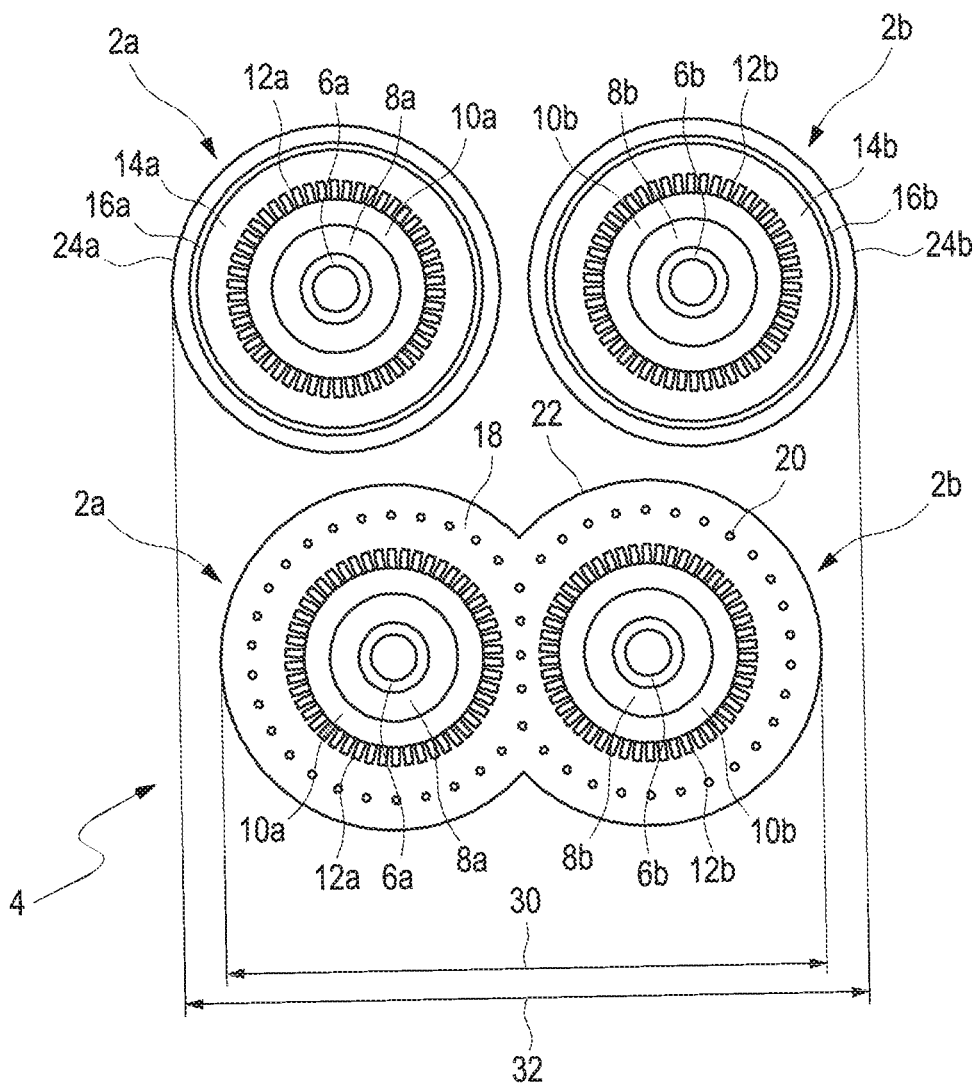
FIG. 2 shows the embodiment of the system according to the invention in a schematic illustration.

FIG. 2 shows both original electric machines 2a, 2b, still in the state when they are separated from each other as was schematically illustrated in FIG. 1a, wherein a housing 24a, 24b is also shown here for each electric machine 2a, 2b, which thus concentrically encloses the coolant circuit 16a, 16b of the respective electric machine 2a, 2b. For comparison purposes, FIG. 2 here shows also the embodiment of the system 4 according to the invention that was illustrated already in FIG. 1c, wherein as can be seen from FIG. 2, the joined electric machines 2a, 2b have a reduced footprint within the system 4 on the common stator metal plate 18 (first double arrow 30), which is smaller than that of both independent electric machines 2a, 2b (second double arrow 32) in the state when they are independent of each other.

The invention claimed is:

1. A system comprising:
at least two electric machines, wherein each electric machine includes a stator and a rotor rotatable about a shaft, wherein the stator is provided with a stator metal plate with an outer wall that is locally limited and flattened in at least one location on a circumference of the stator metal plate, wherein the circumference is otherwise formed with a round shape, wherein the electric machines are arranged next to each other, wherein for each two directly adjacent electric machines, the circumferences of the stator metal plates converge toward each other to form a concavity such that the respective locally limited flattened locations of the outer walls of the circumference of the stator metal plates of the respective electric machines are proximate to and face one another, wherein the respective two directly adjacent electric machines are connected at the respective locally limited flattened locations to form a common stator metal plate, wherein a common cooling circuit is provided for the common stator metal plate, the common cooling circuit including a plurality of holes about the circumferences of each stator plate, and a plurality of shared holes along the connected locally limited flattened locations of the common stator metal plate.

2. The system according to claim 1, further comprising a housing in which the at least two electric machines are arranged together.

3. The system according to claim 1, wherein the system can be employed for operating a vehicle and assigned to operate the vehicle.

* * * * *